United States Patent
Wulff et al.

(10) Patent No.: US 8,773,260 B2
(45) Date of Patent: Jul. 8, 2014

(54) SYSTEM AND METHOD FOR MONITORING A MOBILE COMPUTING PRODUCT/ARRANGEMENT

(75) Inventors: Thomas Wulff, North Patchogue, NY (US); David Bellows, Wantagh, NY (US); Kevin Cordes, Miller Place, NY (US)

(73) Assignee: Symbol Technologies, Inc., Holtsville, NY (US)

(*) Notice: Subject to any disclaimer, the term of this patent is extended or adjusted under 35 U.S.C. 154(b) by 400 days.

(21) Appl. No.: 13/097,532

(22) Filed: Apr. 29, 2011

(65) Prior Publication Data

US 2011/0205076 A1    Aug. 25, 2011

Related U.S. Application Data

(63) Continuation of application No. 10/903,225, filed on Jul. 30, 2004, now abandoned.

(60) Provisional application No. 60/559,735, filed on Apr. 6, 2004.

(51) Int. Cl.
| | |
|---|---|
| *G08B 1/08* | (2006.01) |
| *G06F 1/32* | (2006.01) |
| *G06F 21/88* | (2013.01) |
| *G01P 3/50* | (2006.01) |
| *G01P 1/12* | (2006.01) |
| *G01P 15/00* | (2006.01) |
| *H04W 52/02* | (2009.01) |
| *G06F 1/16* | (2006.01) |
| *G06F 3/01* | (2006.01) |
| *G03B 17/18* | (2006.01) |
| *H04M 1/725* | (2006.01) |

(52) U.S. Cl.
CPC ......... *G06F 1/3246* (2013.01); *H04M 1/72569* (2013.01); *G06F 1/3203* (2013.01); *Y02B 60/50* (2013.01); *G06F 2221/2101* (2013.01); *G06F 21/88* (2013.01); *G03B 2217/18* (2013.01); *G01P 3/50* (2013.01); *G01P 1/127* (2013.01); *Y02B 60/1242* (2013.01); *G01P 15/00* (2013.01); *H04W 52/027* (2013.01); *G06F 1/1694* (2013.01); *G06F 3/017* (2013.01); *H04M 2250/12* (2013.01); *G06F 2221/2111* (2013.01); *G06F 1/1698* (2013.01); *G06F 1/3265* (2013.01); *G03B 17/18* (2013.01); *H04M 1/72572* (2013.01); *G06F 2200/1614* (2013.01); *G06F 1/1626* (2013.01)
USPC ................ 340/539.13; 340/568.1; 340/539.1; 340/539.11

(58) Field of Classification Search
USPC ...................... 340/540, 568.1, 539.11, 539.13
See application file for complete search history.

(56) References Cited

U.S. PATENT DOCUMENTS

| | | | |
|---|---|---|---|
| 3,609,898 | A | 10/1971 | Brown |
| 3,630,476 | A | 12/1971 | Lococo |

(Continued)

FOREIGN PATENT DOCUMENTS

| | | |
|---|---|---|
| CN | 1278348 A | 12/2000 |
| CN | 1869863 A | 11/2006 |

(Continued)

OTHER PUBLICATIONS

Final Rejection for U.S. Appl. No. 10/903,225 mailed Oct. 15, 2008, a related application.

(Continued)

*Primary Examiner* — Travis Hunnings

(57) ABSTRACT

Described is a system and method for monitoring a mobile computing Arrangement. The arrangement may include a sensor and a processor. The sensor detects first data of an event including a directional orientation and a motion of the arrangement. The processor compares the first data to second data to determine if at least one predetermined procedure is to be executed. The second data may include a predetermined threshold range of changes in the directional orientation and the motion. If the predetermined procedure is to be executed, the processor selects the predetermined procedure which corresponds to the event as a function of the first data. Subsequently, the predetermined procedures is executed.

19 Claims, 3 Drawing Sheets

(56) References Cited

U.S. PATENT DOCUMENTS

| | | |
|---|---|---|
| 3,854,685 A | 12/1974 | Parduhn |
| 4,067,523 A | 1/1978 | Kenny et al. |
| 4,251,798 A | 2/1981 | Swartz et al. |
| 4,369,361 A | 1/1983 | Swartz et al. |
| 4,387,297 A | 6/1983 | Swartz et al. |
| 4,409,470 A | 10/1983 | Shepard et al. |
| 4,448,510 A | 5/1984 | Murakoshi |
| 4,583,311 A | 4/1986 | Hosey et al. |
| 4,760,248 A | 7/1988 | Swartz et al. |
| 4,791,540 A | 12/1988 | Dreyer, Jr. et al. |
| 4,794,239 A | 12/1988 | Allais |
| 4,862,298 A | 8/1989 | Genheimer et al. |
| 4,883,341 A | 11/1989 | Whitehead |
| 4,896,026 A | 1/1990 | Krichever et al. |
| 4,903,172 A | 2/1990 | Schoniger et al. |
| 4,907,773 A | 3/1990 | Menchetti et al. |
| 4,947,300 A | 8/1990 | Wen |
| 4,994,941 A | 2/1991 | Wen |
| 5,148,153 A | 9/1992 | Haymond |
| 5,224,770 A | 7/1993 | Simmons et al. |
| 5,227,929 A | 7/1993 | Comerford |
| 5,235,472 A | 8/1993 | Smith |
| 5,276,916 A | 1/1994 | Pawlish et al. |
| 5,280,162 A | 1/1994 | Marwin |
| 5,304,786 A | 4/1994 | Pavlidis et al. |
| 5,373,213 A | 12/1994 | Smith |
| 5,392,290 A | 2/1995 | Brown et al. |
| 5,436,838 A | 7/1995 | Miyamori |
| 5,441,300 A | 8/1995 | Yokota et al. |
| 5,490,411 A | 2/1996 | Hogan |
| 5,521,772 A | 5/1996 | Lee et al. |
| RE35,269 E | 6/1996 | Comerford |
| 5,536,930 A | 7/1996 | Barkan et al. |
| 5,537,270 A | 7/1996 | Morehouse et al. |
| 5,546,687 A | 8/1996 | Iorfida |
| 5,566,098 A | 10/1996 | Lucente et al. |
| 5,610,387 A | 3/1997 | Bard |
| 5,628,034 A | 5/1997 | McIntyre |
| 5,736,725 A | 4/1998 | Danielson |
| 5,740,471 A | 4/1998 | Terui |
| 5,758,267 A | 5/1998 | Pinder et al. |
| 5,783,813 A | 7/1998 | Metlitsky et al. |
| 5,790,490 A | 8/1998 | Satoh et al. |
| 5,811,785 A | 9/1998 | Heiman et al. |
| 5,835,298 A | 11/1998 | Edgerton |
| 5,842,297 A | 12/1998 | Tung |
| 5,957,564 A | 9/1999 | Bruce et al. |
| 5,982,573 A | 11/1999 | Henze |
| 6,023,869 A | 2/2000 | Durbin |
| 6,024,462 A | 2/2000 | Whitehead |
| 6,052,641 A | 4/2000 | Wuerth et al. |
| 6,072,955 A | 6/2000 | Yokouchi et al. |
| 6,076,294 A | 6/2000 | Durbin |
| 6,079,844 A | 6/2000 | Whitehead et al. |
| 6,094,849 A | 8/2000 | Philips et al. |
| 6,137,468 A | 10/2000 | Martinez et al. |
| 6,181,380 B1 | 1/2001 | Toyofuku et al. |
| 6,186,400 B1 | 2/2001 | Dvorkis |
| 6,215,409 B1 | 4/2001 | Blach |
| 6,237,883 B1 | 5/2001 | Levin et al. |
| 6,246,862 B1 | 6/2001 | Grivas et al. |
| 6,283,375 B1 | 9/2001 | Wilz et al. |
| 6,290,134 B1 | 9/2001 | Rando et al. |
| 6,292,215 B1 | 9/2001 | Vincent |
| 6,330,497 B1 | 12/2001 | Obradovich et al. |
| 6,334,063 B1 | 12/2001 | Charlier et al. |
| 6,411,828 B1 | 6/2002 | Lands et al. |
| 6,457,134 B1 | 9/2002 | Lemke et al. |
| 6,508,563 B2 | 1/2003 | Parker et al. |
| 6,539,656 B2 | 4/2003 | Maas et al. |
| 6,570,726 B2 | 5/2003 | Mutoh |
| 6,573,883 B1 | 6/2003 | Bartlett |
| 6,604,840 B2 | 8/2003 | Watson |
| 6,634,558 B1 | 10/2003 | Patel |
| 6,664,744 B2 | 12/2003 | Dietz |
| 6,665,613 B2 * | 12/2003 | Duvall .................. 701/485 |
| 6,676,284 B1 | 1/2004 | Willson |
| 6,695,209 B1 | 2/2004 | La |
| 6,707,581 B1 | 3/2004 | Browning |
| 6,846,089 B2 | 1/2005 | Stevenson et al. |
| 6,857,212 B2 | 2/2005 | Velez |
| 6,871,982 B2 | 3/2005 | Holman et al. |
| 6,937,281 B1 | 8/2005 | Ogawa |
| 6,956,564 B1 | 10/2005 | Williams |
| 6,969,034 B2 | 11/2005 | Ware et al. |
| 7,024,031 B1 | 4/2006 | Castellanos-Nolasco et al. |
| 7,102,626 B2 | 9/2006 | Denny |
| 7,251,094 B2 | 7/2007 | Miyano |
| 7,289,102 B2 | 10/2007 | Hinckley et al. |
| 7,301,529 B2 | 11/2007 | Marvit et al. |
| 7,305,146 B2 | 12/2007 | Cheatle |
| 7,389,933 B2 | 6/2008 | Wang |
| 7,401,300 B2 | 7/2008 | Nurmi |
| 7,432,911 B2 | 10/2008 | Skarine |
| 7,440,847 B2 | 10/2008 | Unuma et al. |
| 7,498,951 B2 | 3/2009 | Wardimon |
| 7,539,576 B2 | 5/2009 | Ohnishi et al. |
| 7,611,061 B2 | 11/2009 | Steele et al. |
| 7,619,686 B2 | 11/2009 | Tom |
| 7,655,331 B2 | 2/2010 | Adams et al. |
| 7,769,542 B2 | 8/2010 | Calvarese |
| 7,822,513 B2 | 10/2010 | Wulff |
| 8,019,532 B2 * | 9/2011 | Sheha et al. ............. 701/420 |
| 2001/0013854 A1 | 8/2001 | Ogoro |
| 2001/0030604 A1 * | 10/2001 | Tsuzuki et al. ............. 340/506 |
| 2001/0045465 A1 | 11/2001 | Schmidt et al. |
| 2002/0021278 A1 | 2/2002 | Hinckley et al. |
| 2002/0043561 A1 | 4/2002 | Tsikos et al. |
| 2002/0055861 A1 | 5/2002 | King et al. |
| 2002/0092913 A1 | 7/2002 | Bard et al. |
| 2002/0109782 A1 | 8/2002 | Ejima et al. |
| 2002/0111737 A1 | 8/2002 | Hoisko |
| 2002/0140666 A1 | 10/2002 | Bradski |
| 2002/0165662 A1 | 11/2002 | Maruyama et al. |
| 2002/0186878 A1 | 12/2002 | Hoon et al. |
| 2003/0079387 A1 | 5/2003 | Derose |
| 2003/0087681 A1 | 5/2003 | Sackett et al. |
| 2003/0093216 A1 | 5/2003 | Akiyama |
| 2003/0105983 A1 | 6/2003 | Brakmo et al. |
| 2003/0112144 A1 | 6/2003 | Campman |
| 2003/0122804 A1 | 7/2003 | Yamazaki et al. |
| 2003/0134657 A1 | 7/2003 | Norta et al. |
| 2003/0139205 A1 | 7/2003 | Belcher |
| 2003/0144793 A1 | 7/2003 | Melaku et al. |
| 2003/0234797 A1 | 12/2003 | Williams et al. |
| 2003/0234979 A1 | 12/2003 | Poo et al. |
| 2004/0026136 A1 | 2/2004 | Hill et al. |
| 2004/0036712 A1 | 2/2004 | Cardno |
| 2004/0193369 A1 | 9/2004 | Kokojima et al. |
| 2004/0201595 A1 | 10/2004 | Manchester |
| 2004/0203897 A1 | 10/2004 | Rogers |
| 2004/0204125 A1 | 10/2004 | Messel et al. |
| 2004/0212586 A1 | 10/2004 | Denny |
| 2004/0216343 A1 | 11/2004 | Golding |
| 2004/0226209 A1 | 11/2004 | Ayala |
| 2004/0245334 A1 | 12/2004 | Sikorski et al. |
| 2004/0246229 A1 | 12/2004 | Yamada |
| 2004/0266480 A1 | 12/2004 | Hjelt et al. |
| 2005/0012591 A1 * | 1/2005 | Tomljenovic et al. ........ 340/5.31 |
| 2005/0060088 A1 | 3/2005 | HeJal et al. |
| 2005/0072032 A1 | 4/2005 | McCollum et al. |
| 2005/0113124 A1 | 5/2005 | Syrjarinne et al. |
| 2005/0127258 A1 | 6/2005 | Lapointe et al. |
| 2005/0154798 A1 | 7/2005 | Nurmi |
| 2005/0175282 A1 | 8/2005 | Wright et al. |
| 2005/0183118 A1 | 8/2005 | Wee et al. |
| 2005/0219552 A1 | 10/2005 | Ackerman et al. |
| 2005/0222801 A1 | 10/2005 | Wulff et al. |
| 2005/0222802 A1 | 10/2005 | Tamura et al. |
| 2006/0052109 A1 | 3/2006 | Ashman et al. |
| 2006/0114244 A1 | 6/2006 | Saxena et al. |
| 2006/0152365 A1 * | 7/2006 | Kim .................. 340/571 |
| 2007/0057067 A1 | 3/2007 | He |
| 2007/0257836 A1 | 11/2007 | Chaplin |

(56) References Cited

U.S. PATENT DOCUMENTS

| | | | |
|---|---|---|---|
| 2007/0297028 A1 | 12/2007 | Wulff et al. |
| 2007/0298751 A1 | 12/2007 | Wulff |
| 2008/0001929 A1 | 1/2008 | Wulff |

FOREIGN PATENT DOCUMENTS

| | | |
|---|---|---|
| EP | 364676 A2 | 4/1990 |
| EP | 377309 A2 | 7/1990 |
| EP | 0564160 B1 | 10/1993 |
| EP | 944017 A2 | 9/1999 |
| EP | 1069541 A2 | 1/2001 |
| EP | 1104143 A2 | 5/2001 |
| EP | 1286166 A1 | 2/2003 |
| EP | 1355223 A2 | 10/2003 |
| EP | 1617629 A1 | 1/2006 |
| GB | 2310525 A | 8/1997 |
| GB | 2347593 A | 9/2000 |
| GB | 2361989 A | 11/2001 |
| GB | 2420620 A | 5/2006 |
| JP | 04268254 A | 9/1992 |
| JP | 6350895 A | 12/1994 |
| JP | 08043425 A | 2/1996 |
| JP | 09006473 A | 1/1997 |
| JP | 09120323 A | 5/1997 |
| JP | 09134216 A | 5/1997 |
| JP | 09218446 A | 8/1997 |
| JP | 11338597 A | 12/1999 |
| JP | 2000253141 A | 9/2000 |
| JP | 2001034871 A | 2/2001 |
| JP | 2001075546 A | 3/2001 |
| JP | 2001272413 A | 10/2001 |
| JP | 2002033793 A | 1/2002 |
| JP | 2002251681 A | 9/2002 |
| JP | 2002259066 A | 9/2002 |
| JP | 2002300651 A | 10/2002 |
| JP | 2002343074 A | 11/2002 |
| JP | 2004104213 A | 4/2004 |
| JP | 2005241331 A | 9/2005 |
| WO | 9313604 A1 | 7/1993 |
| WO | 9821520 A1 | 5/1998 |
| WO | 9922338 A1 | 5/1999 |
| WO | 9939319 A2 | 8/1999 |
| WO | 0118776 A2 | 3/2001 |
| WO | 0127727 A2 | 4/2001 |
| WO | 0179748 A2 | 10/2001 |
| WO | 02088853 A1 | 11/2002 |
| WO | 03001340 A2 | 1/2003 |
| WO | 03088513 A1 | 10/2003 |
| WO | 2004020951 A1 | 3/2004 |
| WO | 2004057595 A1 | 7/2004 |
| WO | 2005101028 A2 | 10/2005 |
| WO | 2005103863 A2 | 11/2005 |
| WO | 2006028514 A1 | 3/2006 |
| WO | 2007016181 A1 | 2/2007 |
| WO | 2007149747 A2 | 12/2007 |

OTHER PUBLICATIONS

Advisory Action for U.S. Appl. No. 10/903,225 mailed Nov. 13, 2008, a related application.
Non Final Rejection for U.S. Appl. No. 10/903,225 mailed Mar. 17, 2008, a related application.
English Translation of First Office Action for Chinese Application Serial No. 200580015277.0 dated Oct. 30, 2009, a foreign counterpart of U.S. Appl. No. 10/903,225, a related application.
Office Action for European Application Serial 05733020.1 dated Jul. 20, 2009, a foreign counterpart of U.S. Appl. No. 10/903,225, a related application.
Office Action for European Application Serial 05733020.1 dated Jul. 16, 2010, a foreign counterpart of U.S. Appl. No. 10/903,225, a related application.
International Report on Patentability and the Written Opinion of the International Searching Authority for PCT/US2005/10971 mailed Jun. 24, 2008, a foreign counterpart of U.S. Appl. No. 10/903,225, a related application.
Reply Brief for U.S. Appl. No. 10/903,225 dated Jul. 27, 2009, a related application.
Appeal Brief for U.S. Appl. No. 10/903,225 dated Feb. 13, 2009, a related application.
PCT/US05/10971 International Search Report dated Jun. 24, 2008, a foreign counterpart of U.S. Appl. No. 10/903,225, a related application.
Australia Application No. 2005233951 First Office Action, mailed on Dec. 10, 2009 a foreign counterpart of U.S. Appl. No. 10/903,225, a relation application.
Supplementary European search report for European Application 05733020.1 mailed Feb. 2, 2009.
Australia Application No. 2005233951 Second Office Action, mailed on Jan. 7, 2011, a foreign counterpart, a relation application.
Canada Application No. 2562154 Office Action mailed on Nov. 29, 2010, a foreign counterpart, a relation application.
English Translation of Second Office Action for Chinese Application Serial No. 200580015277.0 dated Jun. 2, 2011, a foreign counterpart, a related application.
Office Action for European Application Serial 05733020.1 dated Aug. 22, 2011, a foreign counterpart, a related application.
English Translation of First Office Action for Japanese Application Serial No. 2007-507376 dated Nov. 5, 2010, a foreign counterpart, a related application.
English Translation of Final Office Action for Japanese Application Serial No. 2007-507376 dated Aug. 1, 2011, a foreign counterpart, a related application.
Final Office Action dated Aug. 11, 2009 for related U.S. Appl. No. 10/748,992.
Advisory Action for U.S. Appl. No. 10/748,992 mailed Aug. 28, 2007.
Final Office Action dated Jun. 14, 2007 for related U.S. Appl. No. 10/748,992.
Non Final Office Action dated Mar. 1, 2007 for related U.S. Appl. No. 10/748,992.
Advisory Action for U.S. Appl. No. 10/748,992 mailed Dec. 13, 2005.
Final Office Action dated Sep. 20, 2005 for related U.S. Appl. No. 10/748,992.
Non Final Office Action dated Jun. 28, 2005 for related U.S. Appl. No. 10/748,992.
Non Final Office Action dated Apr. 2, 2009 for related U.S. Appl. No. 11/478,963.
Final Office Action mailed on Aug. 24, 2011 in United States for counterpart U.S. Appl. No. 12/648,459, Thomas Wulff, filed on Dec. 29, 2009.
Non Final Office Action mailed on Dec. 23, 2010 in United States for counterpart U.S. Appl. No. 12/648,459, Thomas Wulff, filed on Dec. 29, 2009.
International Preliminary Report on Patentability and the Written Opinion of the International Searching Authority for PCT/US2006/029066 mailed Jan. 29, 2008, a foreign counterpart of U.S. Appl. No. 11/190,246, a related application.
First Office Action for Chinese Application No. 200680035001.3 dated Aug. 7, 2009, a foreign counterpart of U.S. Appl. No. 11/190,246, a related application.
English Translation of Office Action for Chinese Application No. 200680035001,3 dated Sep. 1, 2010, a foreign counterpart of U.S. Appl. No. 11/190,246, a related application.
Notice of Allowance for U.S. Appl. No. 11/190,246 dated Oct. 8, 2009, a related application.
Notice of Allowance for U.S. Appl. No. 11/190,246 mailed May 18, 2009, a related application.
Non Final Rejection for U.S. Appl. No. 11/190,246 mailed Dec. 15, 2008, a related application.
Advisory Action for U.S. Appl. No. 11/190,246 mailed Oct. 14, 2008, a related application.
Final Rejection for U.S. Appl. No. 11/190,246 mailed Aug. 26, 2008, a related application.
Non Final Rejection for U.S. Appl. No. 11/190,246 mailed Mar. 5, 2008. a related application.

(56) References Cited

OTHER PUBLICATIONS

International Search Report of the International Searching Authority for PCT/US2006/029066 mailed Jul. 12, 2006, a foreign counterpart of U.S. Appl. No. 11/190,246, a related application.
Non-Final Rejection dated Jan. 28, 2010 issued in U.S. Appl. No. 11/190,246. a related application.
PCT/US2006/029066 International Search Report dated Jul. 12, 2006, a foreign counterpart of U.S. Appl. No. 11/190,246, a related application.
European Appl. No. 06788584.8 First Office Action dated May 20, 2008, a foreign counterpart of U.S. Appl. No. 11/190,246, a related application.
English Translation of First Office Action for Chinese Application Serial No. 200680035001.3 dated Aug. 23, 2011, a foreign counterpart.
International Preliminary Report on Patentability and the Written Opinion of the International Searching Authority for PCT/US2007/071067 dated Dec. 22, 2008, a foreign counterpart of U.S. Appl. No. 11/471,949.
PCT/US2007/071067 International Search Report mailed Jan. 11, 2008, a foreign counterpart of U.S. Appl. No. 11/471,949.
Non Final Rejection for U.S. Appl. No. 11/472,243 dated Jun. 11, 2009, a related application.
Final Rejection dated Feb. 5, 2010 issued in U.S. Appl. No. 11/472,243, a related application.
PCT/US2007/070979 International Preliminary Report on Patentability and Written Opinion of the International Searching Authority dated Dec. 22, 2008, a foreign counterpart of U.S. Appl. No. 11/472,243, a related application.
PCT/US2007/070979 International Search Report dated Nov. 20, 2007, a foreign counterpart of U.S. Appl. No. 11/472,243, a related application.
EPO Appl. No. 07798429.2 Second Office Action dated Oct. 5, 2010, a foreign counterpart.
Notice of Allowance for U.S. Appl. No. 11/525,488 dated Jun. 15, 2009, a related application.
Non Final Rejection for U.S. Appl. No. 11/525,488 dated Dec. 19, 2008, a related application.
Ex Parte Quayle Action for U.S. Appl. No. 11/525,488 dated Jun. 27, 2008, a related application.
Non Final Rejection for U.S. Appl. No. 11/624,327 dated Oct. 13, 2009, a related application.
Notice of Allowance dated Apr. 5, 2010 issued in U.S. Appl. No. 11/624,327, a related application.
Miniature MEMS Accelerometer Adds Motion Sensing to Consumer Products, Ashok Bindra, Jun. 26, 2000.
MEMS Accelerometers for Motion Detection, Jim Pinto, Aug. 6, 2003.
MEMS, Stephanie Izarek, Apr. 3, 2001, PC Magazine.
Analog Devices Expands Low-G MEMS Portfolio with 3-Axis Accelerometer Technology for Portable Applications, Jan. 31, 2005, Business Wire.
Accelerometers: Jump into the Consumer Market, Michelle A. Clifford, Aug. 2004, Sensormag.com.
Pedestrian Tracking with Shoe-Mounted Inertial Sensors by Eric Foxlin-IEEE Computer Graphics and Application, Nov./Dec. 2005.
English language Abstract of Japanese Patent Publication No. 8043425 A, Japanese Patent Office, Patent & Utility Model Gazette, Patent Abstracts of Japan, (1996).
Non Final Rejection for U.S. Appl. No. 13/111,493 dated Oct. 12, 2012.
Non Final Rejection for U.S. Appl. No. 13/097,287 dated Oct. 15, 2012.
EPO Appl. No. 07798429.2 First Office Action dated May 11, 2009, a foreign counterpart of U.S. Appl. No. 11/472,243, a related application.
English Translation of First Office Action for Chinese Application Serial No. 200780028587.5 dated Jun. 2, 2011, a foreign counterpart.
Decision to Grant mailed Nov. 2, 2012 in European Patent Application No. 07798429.2.
European Search Report mailed Aug. 29, 2011 in European Patent Application No. 11174542.8.
European Search Report mailed Aug. 29, 2011 in European Patent Application No. 11174555.0.
Final Office Action mailed Jul. 5, 2013 in U.S. Appl. No. 13/111,493, Thomas Wulff, filed May 19, 2011.
Final Office Action mailed Jul. 8, 2013 in U.S. Appl. No. 13/097,287, Thomas Wulff, filed Apr. 29, 2011.
Final Office Action mailed Nov. 15, 2007 in U.S. Appl. No. 11/580,732, Dayou Wang, filed Oct. 13, 2006.
Final Office Action mailed Sep. 25, 2013 in U.S. Appl. No. 12/648,459, Thomas Wulff, Dec. 29, 2009.
Final Rejection mailed Aug. 12, 2010 in U.S. Appl. No. 11/471,949, Thomas Wulff, filed Jun. 21, 2006.
Final Rejection mailed Jul. 8, 2009 in U.S. Appl. No. 11/471,949, Thomas Wulff, filed Jun. 21, 2006.
International Search Report and Written Opinion mailed Mar. 28, 2008 in International Patent Application No. PCT/US2007/080691.
International Search Report mailed Dec. 18, 2007 in International Patent Application No. PCT/US2007/071089.
Non Final Office Action mailed Jun. 28, 2012 in U.S. Appl. No. 11/472,243, Thomas Wulff, filed Jun. 21, 2006.
Non Final Office Action mailed May 16, 2007 in U.S. Appl. No. 11/580,732, Dayou Wang, filed Oct. 13, 2006.
Non Final Office Action mailed May 20, 2013 in U.S. Appl. No. 12/648,459, Thomas Wulff, Dec. 29, 2009.
Non Final Rejection mailed Dec. 23, 2008 in U.S. Appl. No. 11/471,949, Thomas Wulff, filed Jun. 21, 2006.
Non Final Rejection mailed Dec. 31, 2009 in U.S. Appl. No. 11/471,949, Thomas Wulff, filed Jun. 21, 2006.
Notice of Allowance mailed Feb. 14, 2008 in U.S. Appl. No. 11/580,732, Dayou Wang, filed Oct. 13, 2006.
Notice of Allowance mailed Jun. 25, 2013 in U.S. Appl. No. 11/472,243, Thomas Wulff, filed Jun. 26, 2006.
Notice of Allowance mailed Oct. 18, 2012 in U.S. Appl. No. 11/472,243, Thomas Wulff, filed Jun. 21, 2006.
Notice of Allowance mailed Sep. 9, 2010 in U.S. Appl. No. 11/190,246, Thomas Wulff, filed Jul. 27, 2005.
Notice of Allowance mailed Sep. 13, 2013 in U.S. Appl. No. 11/472,243, Thomas Wulff, filed Jun. 26, 2006.
Office Action mailed Apr. 16, 2012 in European Patent Application No. 06788584.8.
Office Action mailed Oct. 1, 2012 in European Patent Application No. 11174542.8.
Office Action mailed Oct. 2, 2012 in European Patent Application No. 05733020.1.
Office Action mailed Oct. 28, 2011 in Australian Patent Application No. 2011221421.
Office Action mailed Sep. 16, 2013 in European Patent Application No. 05733020.1.
Office Action mailed Sep. 17, 2013 in European Patent Application No. 11174542.8.
Office Action mailed Sep. 17, 2013 in European Patent Application No. 11174555.0.
Office Action mailed Sep. 28, 2012 in European Patent Application No. 11174555.0.
Decision to Grant mailed Nov. 14, 2013 in related European Patent Application No. 06788584.8.
Non Final Office Action mailed Jan. 2, 2014 in U.S. Appl. No. 13/097,287, Thomas Wulff, filed Apr. 29, 2011.
Non Final Office Action mailed Jan. 28, 2014 in U.S. Appl. No. 12/648,459 Thomas Wulff, filed Dec. 29, 2009.
Non Final Office Action mailed on Aug. 7, 2008 in U.S. Appl. No. 11/471,979, Michael Iverson, filed Jun. 21, 2006.
Notice of Allowance dated Apr. 28, 2012 in related Chinese Patent Application No. 200680035001.3.
Office Action dated Jan. 21, 2014 in related Canadian Patent Application No. 2616838.
Office Action dated Jan. 27, 2014 in related Chinese Patent Application No. 201210241479.9.

(56) References Cited

OTHER PUBLICATIONS

Office Action dated Jun. 13, 2012 in related Chinese Patent Application No. 200780028587.5.

Office Action dated May 21, 2013 in related Canadian Patent Application No. 2616838.

Office Action mailed Aug. 7, 2013 in related Canadian Application No. 2562145.

Office Action mailed Mar. 14, 2013 in Australian Patent Application No. 2011221421.

Office Action mailed Sep. 17, 2013 in counterpart Japanese Patent Application No. 2011-263762.

\* cited by examiner

SYSTEM AND METHOD FOR MONITORING A MOBILE COMPUTING PRODUCT/ARRANGEMENT

PRIORITY CLAIM

This Application is a continuation of U.S. patent application Ser. No. 10/903,225 filed on Jul. 30, 2004, which claims the benefit of the U.S. Provisional Application Ser. No. 60/559,735 filed on Apr. 6, 2004, the contents of which are all expressly incorporated herein, by reference in their entirety.

BACKGROUND INFORMATION

Business and individuals today rely on mobile computing products/arrangements ("MCPs", e.g., bar code readers, PDAs, laptops, two-way pagers, mobile phones, digital cameras, mobile optical readers) in a multitude of situations ranging from basic everyday tasks to highly specialized procedures. As the virtues and benefits of utilizing MCPs continue to be realized across increasingly diverse industries, the features and capabilities of these products are expanding at a correspondingly rapid pace. In many industries, MCPs have gone from fashionable accessories to essential business components used by all levels of personnel.

Accordingly, a great need has developed for MCPs to perform complicated tasks quickly, efficiently and reliably. However, as conventional MCPs are fitted with more advanced gadgetry and software features, sacrifices are often made with respect to durability, power management and user-friendliness. While many methods have been devised attempting to resolve these difficulties, MCPs currently continue to suffer from problems of inefficient power usage, complicated operational procedures and on-screen menus, and the inability to tolerate the harsh industrial conditions to which the products may be subjected.

In the ongoing search for solutions to these problems, one aspect of MCPs that has remained overlooked is a product's kinetic state. From an MCP's motions, valuable information may be extracted from which various predetermined procedures directed at accomplishing some useful end or preventing some harmful result may be executed. Therefore, it is desirable to be able to detect, interpret and utilize the movements experienced by MCPs.

SUMMARY OF THE INVENTION

Described is a system and method for monitoring a mobile computing Arrangement. The arrangement may include a sensor and a processor. The sensor detects first data of an event including a directional orientation and a motion of the arrangement. The processor compares the first data to second data to determine if at least one predetermined procedure is to be executed. The second data may include a predetermined threshold range of changes in the directional orientation and the motion. If the predetermined procedure is to be executed, the processor selects the predetermined procedure which corresponds to the event as a function of the first data. Subsequently, the predetermined procedure is executed.

DETAILED DESCRIPTION

Figure 1:
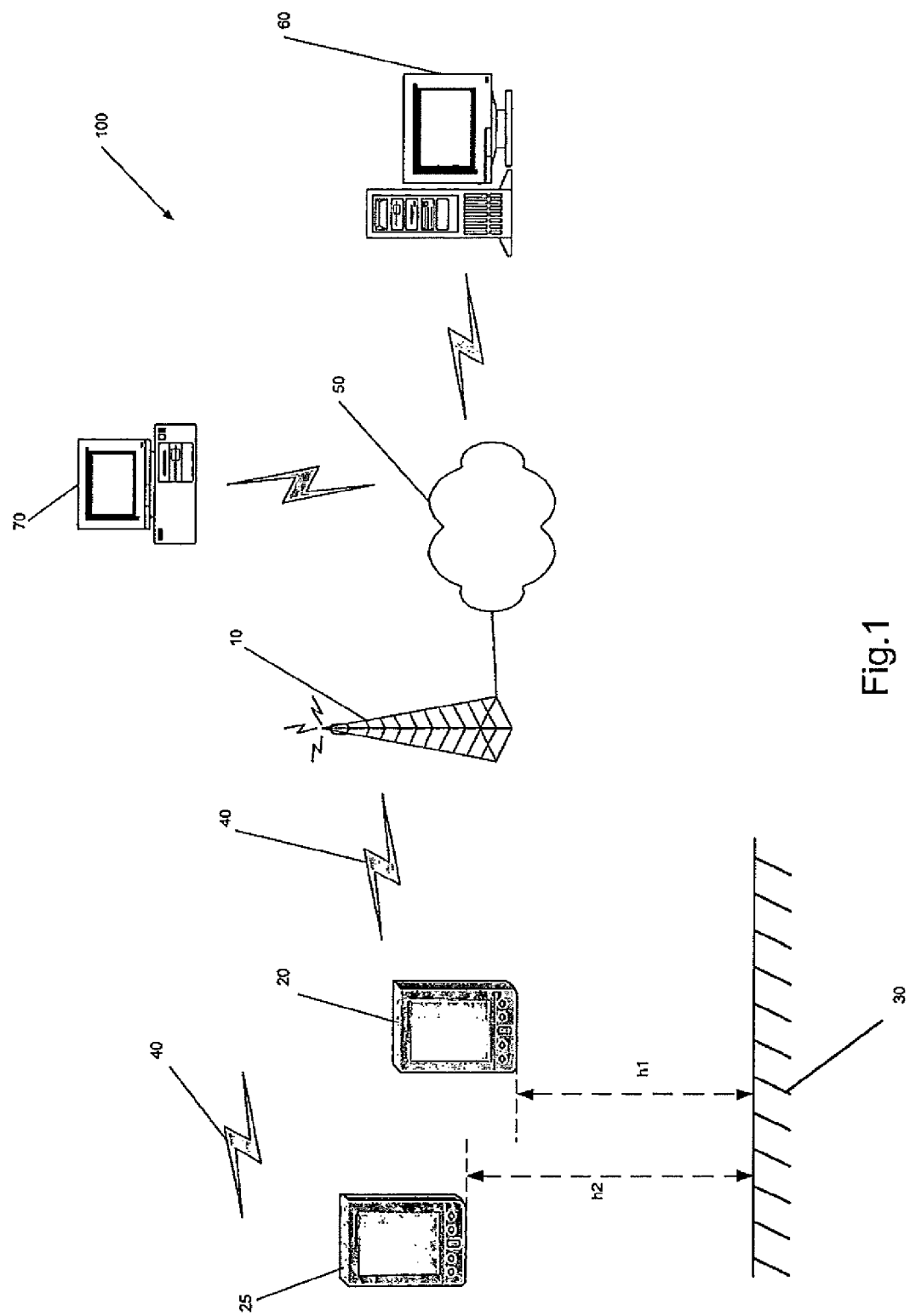
FIG. 1 shows an exemplary embodiment of a mobile network according to the present invention.

The present invention may be further understood with reference to the following description and the appended drawings, wherein like elements are provided with the same reference numerals. The present invention relates to an MCP which includes a sensor that monitors the MCP's directional orientation and motion. In particular, the sensor may measure the MCP's acceleration, velocity, or angular velocity in any direction, orientation with respect to the user, the forces on the MCP upon impact, the direction of impact, or any other shocks or movements to which the MCP may be subjected. These measurements may be contrasted with prerecorded movement patterns or predefined levels of acceptable and unacceptable movement. As will be described below, predetermined procedures may then be executed that may be useful in a wide range of applications, including but not limited to abuse indication, power management, gesture input, compensating for undesired motion, display orientation, and security.

FIG. 1 shows an exemplary embodiment of a mobile network 100 according to the present invention. In this embodiment, the mobile network 100 may be operating within a Wireless Local Area Network ("WLAN") 40 in an infrastructure mode. The mobile network 100 may also include an access point ("AP") 10, a plurality of MCPs 20, 25, a communications network 50, a server 60, and a client computer 70. The MCP 20 is height h1 from the ground 30, and the MCP 25 is height h2 from the ground 30. Both MCPs 20, 25 are situated on a three dimensional plane in which they may translate, rotate, pivot, accelerate or otherwise be in motion. Those of skill in the art will understand that the exemplary embodiments of the present invention may be used with any mobile network and that the mobile network 100 is only exemplary.

The WLAN 40 may use a version of the IEEE 802.11 or a similar protocol. One benefit of using a version of the IEEE 802.11 standard is that existing infrastructures using that standard may be adapted to support the system with minimal modifications. With only a simple software upgrade, most MCPs 20, 25 supporting that standard may operate according to the present invention. In alternative exemplary embodiments, different wireless protocols or technologies (e.g., Bluetooth, WWAN, WPAN, infrared) may also be utilized.

Referring back to the mobile network 100, the AP 10 may be, for example, a router, switch or bridge that forms the connection between the WLAN 40 and the communications network 50. Coupled to the WLAN 40 are the MCPs 20, 25, and coupled to the communications network 50 are the server 60 and the client computer 70. The communications network 50 is utilized to transmit data between the various components of the mobile network 100. This communications network 50 can be any network usable to transmit data, such as between microprocessors, and may be a local area network ("LAN"), a wide area network ("WAN") or the Internet. The range of the MCPs 20, 25 are restricted only by the extent of the communications network 50. When the communications network 50 includes the Internet, the range can be essentially unlimited, as long as the AP 10 connected to the communications network 50 is within range of each of the MCPs 20, 25. Therefore, the AP 10 does not have to physically be in the vicinity of the server 60 or the client computer 70, as it may be remotely located by extending network cabling or through the Internet.

The MCPs 20, 25 may be any type of computer or processor based mobile device (e.g., a bar code reader, a PDA, a laptop, a two-way pager, a mobile phone, a digital camera, a mobile optical reader). Since the MCPs 20, 25 are portable, they are capable of connecting to a wireless network, and are sufficiently small to be easily carried. The MCPs 20, 25 may be designed for specific purposes, such as reading barcodes, or may be handheld devices with different purposes, to which various functionalities have been added through separate software modules. In one exemplary embodiment, the MCPs 20, 25 are based on a multi-purpose personal digital assistant ("PDA") such as those running the Microsoft Pocket PC 2003 operating system, or similar.

Figure 2:
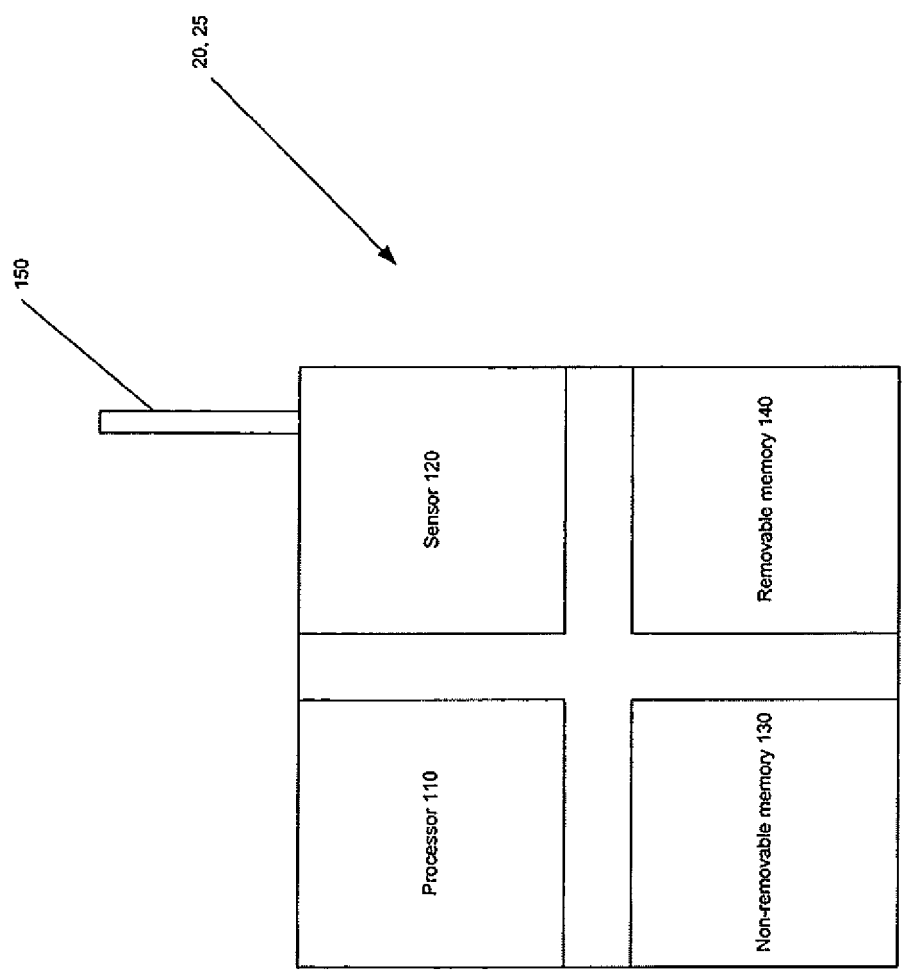
FIG. 2 shows an exemplary embodiment of a mobile computing product/Arrangement according to the present invention.

FIG. 2 shows an exemplary embodiment of an MCP 20, 25 according to the present invention. In this embodiment, the MCP 20, 25 may include a processor 110, a sensor 120, a non-removable memory 130, a removable memory 140, and an antennae 150. The processor 110 is a central processing unit ("CPU") that executes instructions on measurements taken by the sensor 120 and performs procedures such as storing the result in memory or transmitting the result to remote devices through the antennae 150. The non-removable memory 130 is any type of memory component integrated into the electronic architecture of the MCP 20, 25 and may be temporary (e.g., random access memory, or RAM) or permanent (e.g., a hard-disk drive). The removable memory 140 may be any type of detachable memory component that may connect to the MCPs 20, 25 through an expansion interface (e.g., a FLASH interface, a USB interface, a firewire interface, etc.).

In the exemplary embodiment of FIG. 2, the sensor 120 is integrated into the MCPs 20, 25. This sensor 120 may be a device coupled to an electronic architecture of the MCPs 20, 25 that dispatches data to a separate memory device, or it may be coupled to at least a portion of another device in the architecture. For instance, in the latter embodiment, the sensor 120 may be coupled to a memory arrangement in which event data (e.g., a first data of an event relating to the MCP 20, 25's movements with values above a certain threshold) is stored. In an alternative exemplary embodiment, the sensor 120 may be a separate external device that connects to the MCPs 20, 25 through an expansion slot (e.g., a sensor with a FLASH, USB, firewire or similar interface).

The sensor 120 may be any type of measurement device capable of monitoring directional orientation and motion, and may be based on, for example, a G-shock sensor, a switch, an accelerometer, a strain gage, a piezo, MEMS technologies, or combinations of the like. The directional orientation may include any angular movement value with respect to at least one three-dimensional axis of the MCPs 20, 25. The motion may include, for example, a velocity value, an acceleration value, or an angular velocity value. Although the sensor 120 may be of any size, the sensor 120 is preferably small enough so that any added weight and space occupied on the MCPs 20, 25 are negligible. Because the MCPs 20, 25 usually operate on batteries, the sensor 120 should also have a low power consumption. In addition, the sensor 120 should be durable enough to withstand the abusive environments of which its purpose is to monitor.

The sensor 120 detects changes in the directional orientation and motion of the MCP 20, 25 and generates the first data. The first data is provided to the processor 110 which compares the first data to predetermined second data which includes threshold range values. For example, the second data may be a prerecorded rotation of the MCP 20, 25 by ninety degrees, the detection of which may indicate of the occurrence of an event. The second data may be a maximum height from which the MCP 20, 25 is dropped. Subsequently, based on the first data, a particular predetermined procedure is selected and executed.

The first data may be retained for each instance where the measurements of the sensor 120 are above or below the second data which specifies an acceptable threshold level. The processor 110 may also append additional information to the retained first data including sequential numbering of the events, time and date for each event, acceleration data, data corresponding to a status of the MCPs 20, 25 at the date/time of the event, environmental factors, a direction of the shock, etc.

Depending on the application of the present invention, various predetermined procedures may be performed based on the first data. For example, if desired, the first data may be stored in the non-removable memory 130 and/or the removable memory 140 prior to executing any other procedures. Alternatively, the first data may not need to be stored locally at all, instead it is transmitted in real-time for storage and/or further processing by a central server or a remote device. Such a transmission may be accomplished via the communication arrangement of the mobile network 100 of FIG. 1. The WLAN 40 and communications network 50 comprise the communication arrangement, and the server 60 and the client computer 70 comprise the central server or the remote device.

The foregoing embodiments of the mobile network 100 and the MCPs 20, 25 are not to be construed so as to limit the present invention in any way. As will be apparent to those skilled in the art, different types of MCPs 20, 25 may be used to communicate over the same data network, as long as they work under compatible protocols. Other configurations with different numbers of MCPs, APs, or client and server computers may also be used to implement the system and method of the present invention.

In an alternative exemplary embodiment of the mobile network 100, the MCPs 20, 25 may connect to the communications network 50 directly via wires despite being portable. For example, rather than real-time reporting, the MCPs 20, 25 may only be required to connect periodically to the mobile network 100 for updates on their movements as monitored by their respective sensors 120. Furthermore, no wireless capabilities or communications network 50 may be needed entirely. In such a situation, the sensor 120 makes measurements to be processed internally for use locally by the users or manufacturers. For example, the measurements may be used to suggest replacing or repairing the MCP 20, 25 because it has exceeded a threshold of abuse and is in danger of malfunctioning.

Figure 3:
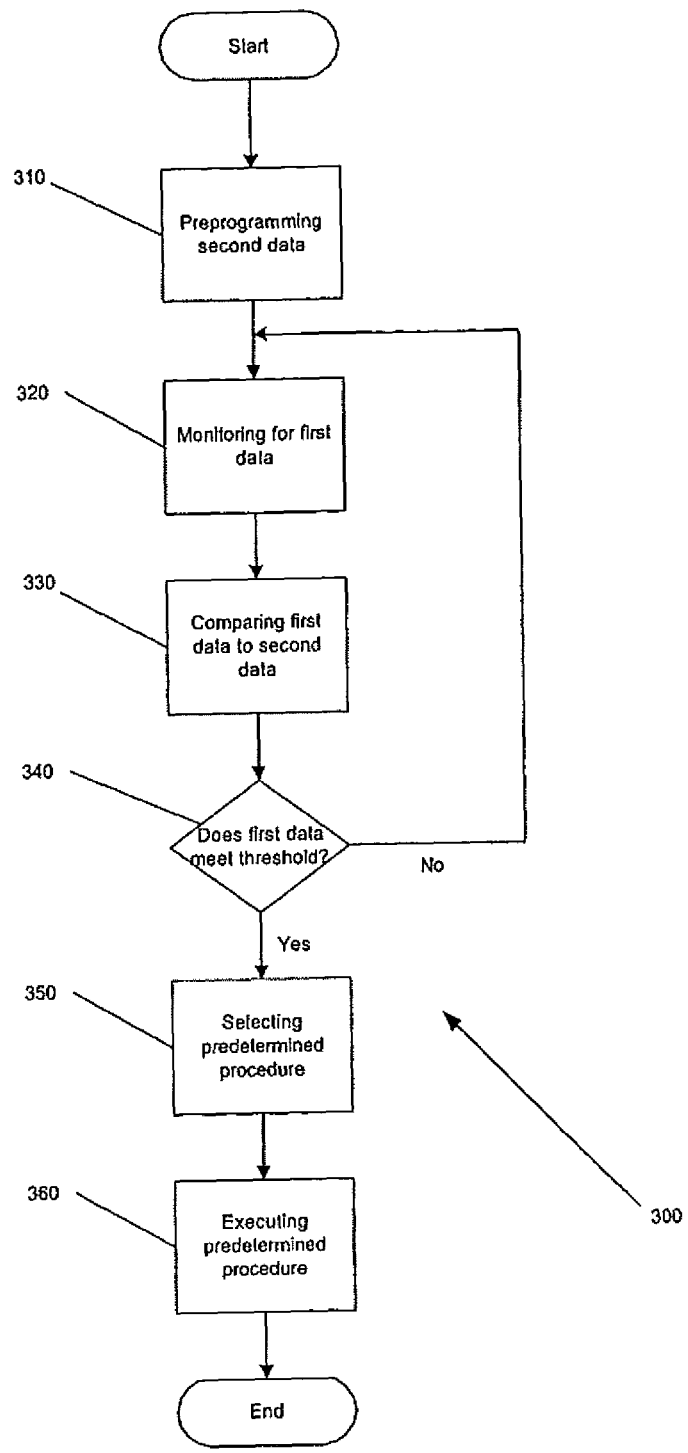
FIG. 3 shows an exemplary embodiment of a method for monitoring a mobile computing product/Arrangement according to the present invention.

FIG. 3 shows an exemplary method 300 for monitoring the MCPs 20, 25. In the step 310, certain distinct characteristics of events (e.g., the second data) are identified and programmed into the MCPs 20, 25. The second data may include a specific threshold value and/or a threshold range of changes in the directional orientation and motion of the MCPs 20, 25. The characteristics may include, for example, maximum or minimum threshold values or prerecorded motions. The user (e.g., the manufacturer, a system administrator or any other authorized person) may designate or, if desired, make changes to these characteristics. For instance, the MCPs 20, 25 may be prepackaged by the manufacturer with static abuse maximum values that are inaccessible or not editable by the user. Alternatively, the threshold may simply be dynamic default values adjustable to future specifications.

In the step 320, the MCP 20, 25 is continuously monitored by the sensor 120 for changes in the directional orientation and/or motion/movements that may constitute the occurrence of a predefined event. An event may include, for example, the MCP 20, 25 being dropped, jerked, tugged, shaken a certain number of times within a certain time period, or remaining still for a specified duration. Whenever the MCP 20, 25 experiences detectable motion or an extended lack thereof, the first data is generated. The sensor 120 may make no effort to differentiate between or prioritize directional orientation or motion values, returning all results to the processor 110 for processing.

In the step 330, the processor 110 compares the measured first data with the predetermined second data. If the characteristics of the first data match those of the second data, the processor 110 determines that an event has occurred and a corresponding predetermined procedure needs to be selected. At the occurrence of an event, the processor 110 may also attach to the first data at least one of a time/date of each event, a status of the computing arrangement, a direction of the acceleration, and environmental data. In an alternative exemplary embodiment of the present invention, the above-described attachment may occur as a part of the predetermined procedure.

For example, when the sensor 120 detects that the MCP 20, 25 came to an abrupt stop after being accelerated for a short period of time, the processor 110, after comparing that information to at least a portion of the preprogrammed second data, may conclude that the MCP 20, 25 dropped to the ground 30. From the magnitude and duration of acceleration, the processor 110 may also determine whether the drop was forcibly induced (e.g., by an abusive user) and the distance h1 or h2 of its displacement. Furthermore, from the direction of impact and other data, the processor 110 may also approximate the part of the MCP 20, 25 that initially made contact with the ground 30 and whether any critical components were directly impacted. Such information may be attached to the first data and may be helpful in determining whether the fall poses a danger to the MCP 20, 25's continued operation.

Due to practical considerations (e.g., memory limitations and processing power) and because not all event occurrences may be significant, the reporting and recording of all movements of the MCP 20, 25 no matter how minor, although possible, may in some instances be impractical. Movements within acceptable limits may be superfluous and have no bearing to applications of the present invention. Therefore, in the step 340, the first data is measured against threshold values contained in the second data. The first data is retained only when at least one event and/or reading satisfies the threshold values or matches the prerecorded motions of the second data; otherwise the first data is discarded and the method 300 is returned to the step 320 for the monitoring of new events.

If the first data falls within the threshold of the second data, the method 300 continues to the step 350 where the processor 110 selects, as a function of the first data, at least one predetermined procedure for execution. In particular, the processor 110 analyzes the measured first data and determines the corresponding procedure of the plurality of predetermined procedures.

In the step 360, the predetermined procedure is executed. The execution of the predetermined procedure may depend upon the specific application of the present invention. For example, the first data may be stored into the non-removable memory 130 or the removable memory 140. A plurality of stored first data records form an event history of the MCP 20, 25. The event history may be readily accessible to any user of the MCP 20, 25, or may be password protected and/or encrypted so that only authorized personnel (e.g., the network administrator or the manufacturer) may gain access.

Other examples of predetermined procedures include encrypting the first data so that it may be accessible only by an authorized user, transmitting the first data to a remote computer, analyzing the event history of the MCP 20, 25 for service recommendations, reporting the cause of any damages, issuing precautionary warnings of the MCP 20, 25's condition, changing the MCP 20, 25's display, powering off, etc. After the predetermined procedure has been successfully executed, the method 300 may resume again at the step 320 to monitor for new event occurrences.

The examples discussed in the foregoing discussion are for illustrative purposes only and are not representative of all possible applications of the present invention. Rather, the present invention may be applied across a diverse range of industries, practice areas, and purposes. The description that follows further outlines the features and advantages of several exemplary applications of the present invention. However, as will be apparent to one skilled in the art, the MCPs 20, 25 may benefit from and make use of an added motion sensor component according to the present invention in many other ways.

As MCPs 20, 25 are increasingly being integrated into the daily operations of businesses today, a need has developed to ensure that these MCPs 20, 25 can withstand the rugged treatment to which they are often subjected. Conventional design and construction techniques yield MCPs 20, 25 that exhibit levels of performance that are only marginal in terms of reliability and durability under the demands of industrial environments. Damaged or malfunctioning MCPs 20, 25 may have devastating effects on the numerous businesses currently relying on mobile solutions. For example, MCPs 20, 25 that are completely inoperable may result in costly delays while replacement products are sought. Also, MCPs 20, 25 with latent malfunctions may cause undetectable computational errors that corrupt systems and induce further errors down the line.

Typically, the user of the MCP 20, 25 has no reliable way of anticipating malfunctions and only discovers a problem as it manifests itself. By that time, damage has often already occurred. Therefore, there is a great need for IT and customer service personnel be able to monitor and accurately determine when the MCP 20, 25 has surpassed an intolerable threshold of abuse. This may be accomplished by establishing measured levels of acceptable and unacceptable usage profiles according to the exemplary embodiments of the present invention. In this way, user profiles may be established and predictions may be made of when the MCP 20, 25 should be replaced prior to it actually malfunctioning. In instances where the MCP 20, 25 is being abused, the customer may intercede to minimize the abusive treatment, thereby reducing the amount of service to and/or replacement of the MCP 20, 25 required and lowering the total cost of ownership.

Referring to the exemplary method 300 of FIG. 3, for example, a maximum level tolerable abuse may be defined in terms of the number of times the MCP 20, 25 is dropped to the ground 30. Thus, in the step 310, a minimum height constituting a drop and maximum number of drops may be specified as a second data. The MCPs 20, 25 may be configured to only record values exceeding the predefined magnitudes. Accordingly, if a threshold for drop altitude were set somewhere between h1 and h2, the MCP 20 dropping to the ground 30 from the height h1 would not appear in its event history, but the MCP 25 dropping to the ground 30 from the height h2 would. In both cases, the sensor 120 generates a first data relating to velocity and acceleration values, and are forwarded to the processor 110. The processor 110, after comparing the first data to the second data, then determines that a drop has occurred and attaches certain other event data. After comparing the first data to the predefined threshold values, the first data is either retained or discarded. Finally, a predetermined procedure is selected based on the first data and executed.

In other exemplary embodiments, the MCPs 20, 25 may similarly be directed to only retain and execute procedures when the first data indicates some form of an abuse. For example, the MCPs 20, 25 may be programmed to execute a procedure only after a predetermined number of events occurring within a predetermined time period has been detected. Furthermore, the MCPs 20, 25 may instead only retain and perform operations when the first data shows an impact to certain critical components or that are oriented in a certain predetermined direction and/or are of a certain predetermined force.

As previously mentioned, the predetermined procedure may vary depending on the specific application of the present invention. For example, in abuse indication, the predetermined procedure may simply be a real-time on-screen display of the updated event history of the MCP 20, 25. If the MCP 20, 25 is being exposed to usage profiles beyond its intended use, it may also be desirable to alert the user through visible warning (e.g., on-screen precautionary displays, flashing LEDs), audible sirens (e.g., using a speaker, headset, receiver) or mechanical alerts (e.g., vibrations, pager motors).

Furthermore, usage profiles detrimental to the MCP 20, 25 may be brought to the attention of a remote party with an interest in its condition. IT and customer service personnel, for example, may monitor the MCP 20, 25's event history in real-time, on-site or off-site, through the communication links of the mobile network 100. In instances where real-time monitoring is impossible or impractical, updates may instead be made in periodic or predetermined intervals. For example, the MCP 20, 25 may have no wireless communication capabilities, may be beyond the wireless operating range of the AP 10, or it may be desirable to conserve the limited bandwidth of the mobile network 110. In such situations, the number and level of unacceptable usage instances experienced by the MCP 20, 25 may be archived for retrieval at a later time. A periodic servicing and maintenance schedule may be established, during which remote parties may obtain updates. The event history may also be downloaded at the end of a shift when the MCP 20, 25 is returned to a docking station or charging cradle.

With the MCP 20, 25's event history, remote parties (e.g., IT and customer service personnel) may perform operations beyond servicing the particular MCP 20, 25. This information may be used by manufacturers for research and development for the benefit of later MCPs 20, 25. By establishing the usage patterns of MCPs 20, 25 operating under similar conditions, future specifications may be tailored to actual conditions of use, adjusting levels of durability based on the expected conditions to which the MCPs 20, 25 may be subjected. Acceptable standards of motion data may then be refined and monitored for excessive abuse according to a new set of criteria.

Still another advantage of the present invention to manufacturers is the ability to archive and retrieve warranty information. Manufacturers' warranties typically only insure against defects arising from production or out of the normal course of usage of the MCP 20, 25, neither of which includes the MCP 20, 25 being dropped in a way that may violate its specifications or being otherwise abused by the customer. However, without any actual knowledge of the MCP 20, 25's usage, manufacturers presented by a customer with a malfunctioning MCP 20, 25 often has no method to accurately determine the cause of the malfunction. If usage information is available either within the MCP 20, 25's memory or in transmissions to the manufacturer, warranty claims may more easily be verified or discredited.

In addition to interacting with the user or remote parties, the MCPs 20, 25 of the present invention may also autonomously monitor their own condition and take actions accordingly. The probability of losing critical data increases substantially when the MCPs 20, 25 are used beyond their intended usage profiles or environmental design specifications. The exemplary embodiments of the present invention allow the MCPs 20, 25 to take preventative measures to ensure against harm during an abusive event. For example, while an MCP 20, 25 is experiencing excessive motion beyond a predetermined usage threshold value (e.g., as the MCP 20, 25 is dropping to the ground 30 from height h1 or h2), the processor 110 in the step 360 may terminate programs containing critical information to prevent data corruption. Access to the non-removable memory 130 or the removable memory 140 by any other components may also be temporarily disabled, avoiding any possible loss of data. If necessary, the MCP 20, 25 may power off or switch into standby mode and not be allowed to resume operations until the abusive event has passed or subsided back within an acceptable range.

Although the exemplary applications of the present invention in foregoing description has primarily focused on abuse indication, the present invention may also be used in a variety of other settings. As described below, these settings include, for example, power management, gesture input, compensating for undesired motion, display orientation, and security.

The power management properties of MCPs have always been a primary focus of product design engineers. Due to their limited size and weight and their mobile nature, MCPs usually have limited power supplies (e.g., rechargeable or disposable battery packs). Developing MCPs that operate for long periods of time, without sacrificing mobility, is an ongoing design challenge. Designing a robust power management system that optimizes and conserves power is a critical element in addressing this challenge.

Understanding the MCP 20, 25 directional orientation with respect to the user is possible by incorporating the previously described sensor 120. As such, it is possible to enhance current power management systems by turning on and off various systems when appropriate. For example, many MCPs 20, 25 have a display and backlight that use a large amount of the available power supply. Utilizing the orientation aspect of the sensor may enable the MCP 20, 25 to keep the display and backlight on only when the display is within the user's viewing angle and range. By employing the exemplary system and method of the present invention, when the MCP 20, 25 is rotated past the viewing angle or brought beyond the visible distance for a predetermined time period, the display and backlight may shut off to save power. When the MCP 20, 25 is rotated back within user's viewing angle or brought within the visible range, the display and backlight may instantaneously turn back on.

Another way in which the present invention may optimize the power management of the MCP 20, 25 may be by switching it into a power conservative state when not in use. Conventional power management systems typically shut down the MCP 20, 25 or switch it into idle mode after a preset amount of time transpires with no interaction from the user. The preset time period is usually adjustable by the MCP 20, 25 software. The present invention uses the lack of motion as an additional trigger to switch the MCP 20, 25 into the idle or shut down modes, thus taking advantage of tendency of the MCPs 20; 25 to be in motion when in use, and conserving energy when at rest. The amount of motionless time needed to trigger the power saving state may also be adjustable by the MCP 20, 25 software.

Continuing with some exemplary applications of the present invention, the combined sensor and MCP 20, 25 of the present invention may also simplify the MCP 20, 25's operation through a gesture input. The advantages afforded by increasingly advanced computing products are often offset by sacrifices to usability and user-friendliness. Elaborate menus, onscreen buttons, procedures or the like frequently frustrate users and impede rather than advance productivity. The ability to sense and analyze motion through the present invention enables the MCP 20, 25 to recognize and react to various motions or user gestures. These motions or gestures may be pre-established to trigger the MCP 20, 25 to perform various functions that would otherwise need to be actuated manually.

For example, if the MCP 20, 25 equipped with a display is in document viewing mode and orientation, a quick flip of the user's wrist detected by the sensor 120 may coincide with the software application flipping to the next page of the document. In another example, when long lists of application options are being displayed to the user, a wrist roll gesture could trigger the MCP 20, 25 to start scrolling down the list. In still another example, if the MCP 20, 25 is a device with data capturing capabilities (e.g., an imager, scanner, camera), a motion detected corresponding to a certain pre-recorded gesture may trigger the MCP 20, 25 to turn on the data capture functionality.

Still another advantage of the present invention is the ability to compensate for an undesirable motion. Although not as detrimental to the MCPs 20, 25 as motion constituting abuse, minor motion values may still adversely affect applications that require as little motion as possible. For example, MCPs 20, 25 with data capture capabilities utilizing various camera technologies produce blurred or out of focus pictures when in motion. Various methods have been developed attempting to offset such undesirable effects, such as weights or stands that minimizes or cancels out extraneous motion.

The present invention may be utilized to address this problem without the need for cumbersome physical attachments or mechanical devices. Undesirable motion may be recognized, processed, and de-sensitized through various software applications employed by the MCP 20, 25 under the exemplary embodiments of the present invention. The MCP 20, 25 may identify a non-acceptable operating situation to the user due to motion through the display or other alert Mechanisms, and/or automatically have the software compensate for the motion during the data capture event.

Furthermore, in MCPs 20, 25 equipped with displays, the orientation sensing capability of the present invention may also conveniently adjust the display orientation with respect to the user. MCPs 20, 25 typically format display data in landscape or portrait mode. Newer mobile software applications enable the display data format to be manually switched between the two. The present invention allows the orientation of the MCP 20, 25 to be monitored relative to the user, enabling the MCP 20, 25 to automatically switch the display data format between the landscape and portrait modes.

As a final exemplary application of the present invention, the combined sensor and MCP 20, 25 of the present invention may be used for purposes of security. Because the MCPs 20, 25 are portable, they are easily misplaced or stolen. By employing the exemplary system and method of the present invention, the MCPs 20, 25 may be able to incorporate security features that indicate their location to the user or prevent use by unauthorized personnel. For example, when the MCP 20, 25 is at rest for a preset period of time (e.g., during recharge, overnight storage), it may enter a secure mode and be programmed to trigger an alarm when motion to the MCP 20, 25 is detected. This alarm may be local to the MCP 20, 25, using audible, visual, or mechanical features. At the same time or as an alternative, the alarm may be triggered in a remote device on-site or off-site using the previously described communication systems. If the MCP 20, 25 utilized tracking technologies (e.g., global positioning system), it may also convey its location. The security features may additionally lock terminal applications, preventing the MCP 20, 25 from being used until an authorized user password is entered.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A mobile computing device, comprising:
a housing;
a sensor coupled to the housing, the sensor generating a sensor signal in response to detecting a motion of the housing; and
a processor receiving the sensor signal from the sensor, the processor activating an alert in response to comparing the sensor signal to a threshold signal, wherein the threshold signal corresponds to a state in which the mobile computing device is at rest for a preset period of time.

2. The mobile computing device of claim 1, further comprising a security module coupled to the processor, the security module activating the alert in response to receiving an alarm signal from the processor.

3. The mobile computing device of claim 1, wherein the alert comprises at least one of a sound, a light, a graphic, a terminal access lock, a mechanical device lock, and a terminal shut down mode.

4. The mobile computing device of claim 1, further comprising a wireless communication arrangement for transmitting a signal to a remote device in response to the activation of the alert.

5. The mobile computing device of claim 4, wherein the remote device comprises one of an access point, a server, a mobile computing device, a gateway device, and a client computer.

6. The mobile computing device of claim 1, further comprising a memory for storing at least one of the sensor signal and the threshold signal.

7. The mobile computing device of claim 1, further comprising an input device for providing a password to disable the alert.

8. The mobile computing device of claim 1, wherein the sensor comprises at least one of an accelerometer, a strain gauge, a piezo electric device, and a microelectromechanical systems (MEMS) device.

9. The mobile computing device of claim 1, further comprising a global positioning system (GPS) module for tracking a location of the mobile computing device.

10. The mobile computing device of claim 9, wherein the processor activates the alert upon tracking the mobile device beyond a predetermined location.

11. A method, comprising:
- detecting, using a sensor, a motion of a mobile computing device;
- generating a sensor signal in response to detecting the motion of the mobile computing device; and
- activating an alert by comparing the sensor signal to a threshold signal, wherein the threshold signal corresponds to a state in which the mobile computing device is at rest for a preset period of time.

12. The method of claim 11, wherein the alert comprises at least one of a sound, a light, a graphic, a terminal access lock, a mechanical device lock, and a terminal shut down process.

13. The method of claim 11, further comprising transmitting a signal to a remote device in response to the activation of the alert.

14. The method of claim 13, wherein the remote device comprises one of an access point, a server, a mobile computing device, a gateway device, and a client computer.

15. The method of claim 11, further comprising storing at least one of the sensor signal and the threshold signal.

16. The method of claim 11, further comprising inputting a password to disable the alert.

17. The method of claim 11, wherein the sensor comprises at least one of an accelerometer, a strain gauge, a piezo electric device, and a microelectromechanical systems (MEMS) device.

18. The method of claim 11, further comprising activating the alert upon tracking the mobile computing device beyond a predetermined location.

19. A mobile computing device, comprising:
- a sensor generating a sensor signal in response to detecting a motion of the mobile computing device;
- means for activating an alert by comparing the sensor signal to a threshold signal, wherein the threshold signal corresponds to a state in which the mobile computing device is at rest for a preset period of time; and
- a wireless communication arrangement for transmitting an alarm signal to a remote device in response to the activation of the alert.

* * * * *